(12) United States Patent
Koch

(10) Patent No.: US 8,711,531 B2
(45) Date of Patent: Apr. 29, 2014

(54) ELECTRICAL INSTALLATION ARRANGEMENT

(75) Inventor: Michael Koch, Vienna (AT)

(73) Assignee: Eaton Industries (Austria) GmbH, Schrems (AT)

( * ) Notice: Subject to any disclaimer, the term of this patent is extended or adjusted under 35 U.S.C. 154(b) by 0 days.

(21) Appl. No.: 13/388,918

(22) PCT Filed: Jun. 1, 2010

(86) PCT No.: PCT/AT2010/000193
§ 371 (c)(1),
(2), (4) Date: Apr. 16, 2012

(87) PCT Pub. No.: WO2011/014895
PCT Pub. Date: Feb. 10, 2011

(65) Prior Publication Data
US 2012/0194950 A1    Aug. 2, 2012

(30) Foreign Application Priority Data

Aug. 5, 2009 (AT) .................................. 1234/09

(51) Int. Cl.
*H02H 3/00* (2006.01)
(52) U.S. Cl.
USPC ........................................................... 361/42
(58) Field of Classification Search
USPC ........................................................... 361/42
See application file for complete search history.

(56) References Cited

U.S. PATENT DOCUMENTS

| 2005/0254187 A1* | 11/2005 | Chu ................................. 361/42 |
| 2006/0114630 A1 | 6/2006 | Culligan et al. |
| 2007/0121261 A1 | 5/2007 | Sung |
| 2008/0158744 A1 | 7/2008 | Rivers et al. |
| 2009/0319207 A1 | 12/2009 | Koch |
| 2010/0213996 A1 | 8/2010 | Koch |
| 2010/0283577 A1 | 11/2010 | Koch |

FOREIGN PATENT DOCUMENTS

| AU | 2007336681 B2 * | 4/2011 |
| DE | 102004058957 | 5/2006 |
| DE | 102004057119 | 6/2006 |
| DE | 102006042768 | 3/2007 |
| EP | 1 840 584 A2 | 10/2007 |
| EP | 1 936 768 A1 | 6/2008 |
| GB | 2 177 561 | 1/1987 |
| WO | WO 2008/077161 | 7/2008 |

* cited by examiner

*Primary Examiner* — Scott Bauer
(74) *Attorney, Agent, or Firm* — Henry M. Feiereisen LLC

(57) ABSTRACT

An arc detector comprises an analysis unit for evaluating the first measurement signal according to at least one first evaluation scheme for detecting an arc or at least one electrical effect of the arc on the electrical load network (2), wherein the electrical installation arrangement (1) further comprises at least one first tripping unit (6), which switches off the first switch (3) and disconnects the load (4) (2) in such a way if an arc is detected by the arc detector (31), wherein in order to reduce false tripping events, a second analysis and/or evaluation scheme is provided, the first evaluation scheme has a higher sensitivity than the second evaluation scheme, the second evaluation scheme is provided if a first living being of a specifiable type is present in a specifiable first surrounding area around the first load (4), and the first evaluation scheme is provided if the first living being is present in the first surrounding area.

15 Claims, 3 Drawing Sheets

ELECTRICAL INSTALLATION ARRANGEMENT

CROSS-REFERENCES TO RELATED APPLICATIONS

This application is the U.S. National Stage of International Application No. PCT/AT2010/000193, filed Jun. 1, 2010, which designated the United States and has been published as International Publication No. WO 2011/014895 and which claims the priority of Austrian Patent Application, Serial No. A 1234/2009, filed Aug. 5, 2009, pursuant to 35 U.S.C. 119 (a)-(d).

BACKGROUND OF THE INVENTION

The invention relates to an electrical installation arrangement for the operation of an electrical consumer network.

Electrical installation arrangements are known which provide protection from arcs and deactivate a consumer or a part of the installation during the occurrence of an arc. Such known installations come with the disadvantage that they are often defective and trip unnecessarily and therefore deactivate consumers and partial networks because the respective arc detectors identify high-frequency disturbances as can occur during the operation of electrical machines erroneously as arcs.

SUMMARY OF THE INVENTION

It is therefore the object of the invention to provide an electrical installation arrangement of the kind mentioned above with which the mentioned disadvantages can be avoided, with which false switch-offs of the electrical installation arrangement can be reduced, but with which a high level of protection can still be achieved.

This is achieved in accordance with the invention by the features of claim 1.

Unnecessary network switch-offs can thereby be prevented and high network availability can be achieved. The security in an electrical consumer network can thereby be controlled in a demand-oriented manner. Protection from arcs can thereby be achieved, wherein especially sensitive methods, algorithms or analytical and/or evaluation schemes for the recognition of an arc or its electrical consequences or effects in the electrical consumer network in the presence of living beings worth protecting such as humans in particular are not used, because such sensitive methods or algorithms can also identify electrical consumers such as electric motors in vacuum cleaners or drills or dimmers as hazardous arcs, leading to erroneous switch-offs. As a result of the increased tripping threshold which is increased in the presence of a human, erroneous tripping can purposefully be prevented during periods in which disturbances are increasingly expected, which could be evaluated by an arc detector erroneously as a hazardous arc. In surrounding areas which are devoid of people on the other hand it is possible to apply low tripping thresholds or sensitive analytical and/or evaluation schemes which respond very sensitively to arcs and enable a secure and rapid switch-off of the respective parts of an electric installation arrangement, since fires which can also be caused by arcs can remain unnoticed over prolonged periods of time in environments devoid of people and can further cause a large amount of damage to assets as a result of firefighting that occurs only very late.

The dependent claims which simultaneously form a part of the description relate to further advantageous embodiments of the invention.

BRIEF DESCRIPTION OF THE DRAWING

The invention will be explained in closer detail by reference to the enclosed drawings which merely show preferred embodiments by way of example, wherein.

DETAILED DESCRIPTION OF PREFERRED EMBODIMENTS

Figure 1:
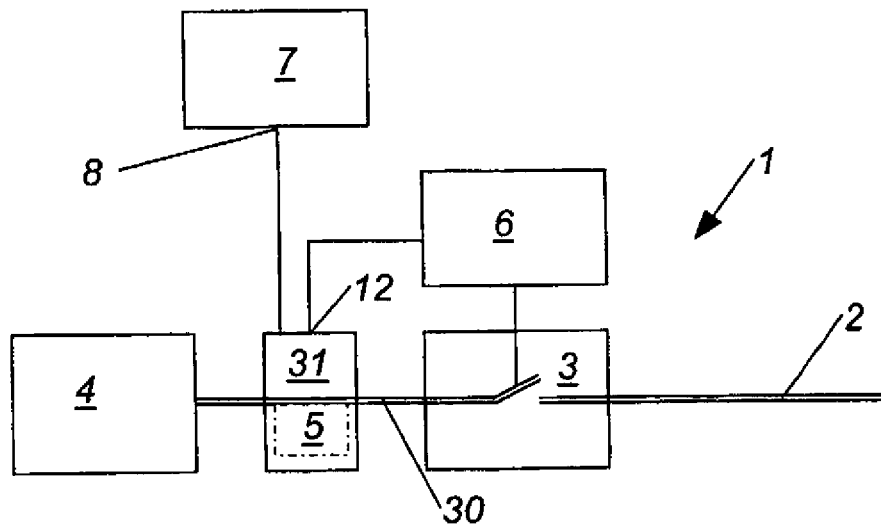
FIG. 1 shows a block diagram of a first embodiment of an installation arrangement in accordance with the invention.

FIGS. 1 to 6 showed different embodiments of an electrical installation arrangement 1 for the operation of an electrical consumer network 2, comprising at least one first switch 3 for the predeterminable disconnection of at least one first consumer 4 and/or partial network 30 from the consumer network 2, at least one first arc detector 31, with the arc detector 31 comprising at least one first sensor 5 for measuring at least one first electrical parameter in the consumer network 2 and for the output of the first measuring signal, with the arc detector 31 further comprising an analysis unit 6 for the analysis and/or evaluation of the first measuring signal as a result of at least one first analytical and/or evaluation scheme for recognising an arc or at least an electrical effect of the arc on the electrical consumer network 2, with the electrical installation arrangement 1 further comprising at least one first tripping unit 6, which upon detection of an arc by the arc detector 31 will switch off the first switch 3 and thereby disconnect the consumer 4 and/or the partial network 30 from the consumer network 2, with a second analytical and/or evaluation scheme being provided, with the first analytical and/or evaluation scheme having a higher sensitivity than the second analytical and/or evaluation scheme, and with the second analytical and/or evaluation scheme being provided if a first living being of a predeterminable type is present in a predeterminable first surrounding area around the first consumer 4 and/or the partial network 30, and the first analytical and/or evaluation scheme is provided if the first living being is present in the first surrounding area.

As a result, unnecessary network switch-offs can be prevented and high network availability can be achieved. The security in an electrical consumer network 2 can thereby be controlled in a demand-oriented manner. Protection from arcs can thereby be achieved, wherein especially sensitive methods, algorithms or analytical and/or evaluation schemes for the recognition of an arc or its electrical consequences or effects in the electrical consumer network 2 in the presence of living beings worth protecting such as humans in particular are not used, because such sensitive methods or algorithms can also identify electrical consumers such as electric motors in vacuum cleaners or drills or dimmers as hazardous arcs, leading to erroneous switch-offs. As a result of the increased tripping threshold which is increased in the presence of a human, erroneous tripping can purposefully be prevented during periods in which disturbances are increasingly expected, which could be evaluated by an arc detector 31 erroneously as a hazardous arc. In surrounding areas which are devoid of people on the other hand low tripping thresholds or sensitive analytical and/or evaluation schemes are applied which respond very sensitively to arcs and enable a secure and rapid switch-off of the respective parts of an electric installation arrangement 1, since fires which can also be caused by arcs can remain unnoticed over prolonged periods of time in environments devoid of people and can further cause a large amount of damage to assets as a result of firefighting that occurs only very late.

Installation arrangements 1 in accordance with the invention are provided for the operation of any kind of an electrical consumer network 2. In particular, they are provided for electrical end consumer networks 2 or domestic supply networks which are operated in Europe for example with a voltage of 230 V/400 V. The designation of network 2 will be used below for consumer networks 2. Consumers 4 can be disconnected from the network 2 by the installation arrangements 1 in accordance with the invention, or entire partial networks 30, which are therefore partial areas of a network 2, can be switched off. The partial area of the network 2 will be designated as partial network 30, as shown in FIGS. 1 to 6, which partial network can be switched off by the first switch 30 and is therefore the partial area of the network 2 protected by the first switch 30. Unless designated otherwise, the embodiments relating below to the disconnection of the first consumer 4 from the network 2 can also relate to the disconnection of a partial network 30 from the network 2. This can especially be provided for the protection of first living beings and also for the protection of installations from fires caused by electricity. Humans, pets and farm animals will be designated as the first living beings of a predeterminable type or living beings worthy of protection.

Installation arrangements 1 in accordance with the invention comprise at least one first switch 3 which connects at least one first consumer 4 or a partial network 30 with the network 2, or is provided to disconnect them from the network 2. The first switch 3 can concern any kind of switch 3 which is capable of switching the expected currents during the disconnection of a consumer 4 from the network 2, but also applies to the case of a short-circuit for example. It can especially be provided and will be explained below in closer detail that the first switch 3 is arranged as a circuit breaker 13. At least one first tripping unit 6 is operatively connected with the first switch 3, or the first switch 3 comprises such a tripping unit 6, by means of which the first switch 3 can be switched off in an automatically controlled manner. The first tripping unit 6 can be arranged as an electromagnetic apparatus for example which switches off the first switch 3 in an electrically controlled way.

The installation arrangement 1 in accordance with the invention further comprises at least one first arc detector 31 for the at least indirect detection of an arc or at least an electric effect of the arc on the electric consumer network 2. The arc detector 31 comprises at least one first sensor 5 for the measurement of at least one first electric parameter in the consumer network 2 such as a voltage and/or a current, and for the output of the first measuring signal. The first sensor 5 can be arranged as a sensor of any predeterminable type, wherein it is especially provided that the at least one first sensor 5 is arranged as a current sensor and/or as a voltage sensor for recording a current and/or voltage signal in a manner substantially true to the signal in at least one electric line of the electric network 2, by means of which the effects of an arc in the form of voltage and/or current peaks in the electric network 2 can be measured or detected in order to recognise an arc. Preferably, the sensor 5 is arranged either as or comprising a current converter, a Förster probe, a Hall generator, a shunt resistor, a voltmeter or the like, wherein especially also the combination of two or more sensors 5 can be provided.

The electrical installation arrangement 1 further comprises at least one first tripping unit 6 which upon detection of an arc by the arc detector 31 deactivates the first switch 3 and therefore disconnects the consumer 4 and/or the partial network 30 from the consumer network 2. The at least one first tripping unit 6 is therefore operatively connected with the at least one first switch 3 and the at least one first arc detector 31, especially by means of circuitry. A mechanical transmission of a tripping signal can be provided between the tripping unit 6 and the switch 3. Conventional circuit breakers often comprise externally accessible mechanical interfaces for the external tripping of the respective circuit breaker.

The arc detector 31 further comprises an analysis unit for the analysis and/or evaluation of the first measuring signal on the basis of at least one first analytical and/or evaluation scheme for recognising an arc or at least an electric effect of the arc on the electrical consumer network 2. An analytical and/or evaluation scheme preferably comprises at least one arc recognition algorithm and/or at least one comparison parameter. That is why it is preferably provided that the first measuring signal in the analysis unit is processed with an arc recognition algorithm and is subsequently compared with a comparison parameter, with the arc detector 31 providing the output of the detection of an arc if the first measuring signal processed by the arc recognition algorithm exceeds the at least one first comparison parameter. It can also be provided however that the first measuring signal is compared directly with the at least one first comparison parameter. Preferably, the at least one first comparison parameter is arranged as a set of first comparison parameters, therefore as several comparison parameters or as a comparison array or comparison matrix, of which a part, a predeterminable number or all need to be fulfilled, so that the arc detector 31 will output the detection of an arc. The arc detector 31 comprises an output 12, especially an analogue output and/or a digital output, which is operatively connected preferably by means of circuitry with an input of the tripping unit 6 and is arranged for the transmission of a tripping command.

In accordance with the invention, a second analytical and/or evaluation scheme is provided, with the first analytical and/or evaluation scheme having a higher sensitivity than the second analytical and/or evaluation scheme, with the second analytical and/or evaluation scheme being provided in the presence of a first living being of a predeterminable type in a predeterminable first surrounding area around the first consumer 4 and/or the partial network 30, and with the first analytical and/or evaluation scheme being provided during the absence of the first living being in the first surrounding area. Sensitivity within the terms of the present invention preferably designates the property of the analysis unit to indicate or recognise a specific first measuring signal after its analysis and/or evaluation by the analysis unit as an arc. The term of sensitivity preferably relates to a sensitivity concerning the recognition of at least one first measuring signal as an arc.

In addition to measuring signals which can be allocated unequivocally to a hazardous arc, as are obtained for example during a lightning strike or the formation of an arc between two network conductors, numerous electrical machines such as electric motors or dimmers produce sparks, small arcs or other electrical disturbances at a low level which can show similarities to arcs concerning their disturbance pattern. Depending on the sensitivity of the applied analytical and/or evaluation scheme, there will be an allocation of a disturbance in boundary cases as being caused by an arc or not being caused by an arc. As a result of different analytical and/or evaluation schemes, an electrical installation arrangement 1 in accordance with the invention can therefore be adjusted to different conditions in which the avoidance of false tripping or maximum fire protection is predominant.

It can therefore be provided according to a simple embodiment of the present invention that the first analytical and/or evaluation scheme comprises at least one first comparison parameter, and that the second analytical and/or evaluation scheme comprises at least one second comparison parameter. Such comparison parameters are preferably limit values which, when exceeded, mean the detection of an arc. A higher sensitivity of the first analytical and/or evaluation scheme in relation to the second analytical and/or evaluation scheme therefore means that the first comparison parameters represent lower limit values than the second comparison parameters.

For the purpose of comparing the first measuring signal analysed and evaluated by the analysis unit, the arc detector 31 preferably comprises at least one first comparator circuit.

It is provided according to a preferred embodiment of the present invention that the first analytical and/or evaluation scheme comprises at least one first arc recognition algorithm, that the second analytical and/or evaluation scheme comprises at least one second arc recognition algorithm, and that the first arc recognition algorithm has a higher sensitivity than the second arc recognition algorithm. There will preferably be a different evaluation of the first measuring signal by each of the different the applied arc recognition algorithms.

Since the effect of an arc such as a lightning or a spark gap can be recognised very well on the basis of its temporal progression, it is provided in an especially preferred way that the first sensor 5 is arranged to record a temporal progression of the at least one first electrical parameter, which provides the opportunity of recognising the effects of an arc on the electrical consumer network 2 on the basis of an analysis of the temporal progression of the at least one first electrical parameter and of thereby drawing conclusions on the occurrence of an arc in the sphere of action of the electrical consumer network 2. The arc recognition algorithms are therefore preferably arranged as algorithms for the manipulation of the first measuring signal in the time and/or image area.

It is therefore preferably be provided in this connection that the analysis unit is arranged for the analysis of the first measuring signal in the time area and/or in the image area, and especially comprises a microprocessor, microcontroller and/or a digital signal processor. It is preferably provided for an especially secure, efficient and purposeful analysis of the first electrical parameter or a first measuring quantity which is determined by the first sensor 5 and maps the first electrical parameter that the first measuring quantity is regarded as a frequency-dependent signal and is transformed from a time area to an image area in the form of an FFT, a wavelet transformation or a Laplace transformation, by means of which the first measuring quantity can be further analysed and, as intended above, different arc recognition algorithms are provided different analytical and/or evaluation schemes.

As shown in FIGS. 1 to 4, it can be provided that the first arc detector 31, the first tripping unit 6 and/or the first switch 3 are arranged as separate elements and are arranged or cooperate in a network. It is thereby possible for example to disconnect the first switch 3 from the first arc detector 31 and to record the first measuring quantity in another area than the one where the first switch 3 is arranged. This may especially be advantageous in the case of several arc detectors 31, 33, because a more comprehensive picture of the actual physical conditions will be provided in the partial network 30 that can be switched off by the first switch 3. It can also be provided that at least two of the aforementioned elements are arranged in a common housing and also individual components are used jointly for example, so that only one interface is provided to the outside for example and a single bus controller will distribute received data among the elements. It can be provided in an especially preferred way that the first arc detector 31, the first tripping unit 6 and the first switch 3 are arranged integrally in the form of a circuit breaker 13, by means of which an especially simple and compact arrangement of the circuit can be realised. The present invention therefore further relates to a circuit breaker for an electrical installation arrangement 1 in accordance with the invention, comprising at least one first arc detector 31 and one first tripping unit 6 which is operatively connected with the switching contacts of the circuit breaker 13, wherein the circuit breaker 13 comprises a second means for the predeterminable automatic adjustment to an analytical and/or evaluation scheme.

It is provided in accordance with the invention that the analytical and/or evaluation schemes are changed or adjusted depending on the presence or absence of a first living being of a predeterminable type, wherein such a living being preferably concerns a human, but which can also include farm animals or pets, the presence of which in an area will cause the activation of electrical consumers such as automated feeding installations for fattening animals. For the purpose of predetermining an analytical and/or an evaluation scheme, it is therefore necessary to have knowledge of the presence of first living beings. Such a presence can be entered manually for example in a respective control input of an arc detector 31 in the form of an electric signal for example. It is preferably provided however that the electrical installation arrangement 1 comprises at least one first control and checking unit 7 for the predeterminable automatic adjustment of the analytical and/or evaluation scheme. Such a control and checking unit 7 can be used for adjusting the analytical and/or evaluation scheme to the local or temporary conditions. The control and checking unit 7 can be provided for the adjustment of the analytical and/or evaluation scheme of all arc detectors 31 which are operatively connected with said control and checking unit 7.

It is preferably provided that the first control and checking unit 7 comprises at least one switching logic, especially a microprocessor, and for the communication with the further elements of the installation arrangement comprises at least one output 8 and/or at least one input 9, especially a bus interface 27 and/or a radio interface, wherein the output 8 or input 9 can be arranged both as a digital and/or analogue output or input, or any kind of a bus interface 27 can be provided. It is preferably provided that the different analytical and/or evaluation schemes are stored in an arc detector 31 and a specific analytical and/or evaluation scheme can be chosen and activated or loaded by a command of the control and checking unit 7. It can also be provided that at least one complete analytical and/or evaluation scheme is loaded into the at least one arc detector 31 by means of the control and checking unit 7.

Figure 2:
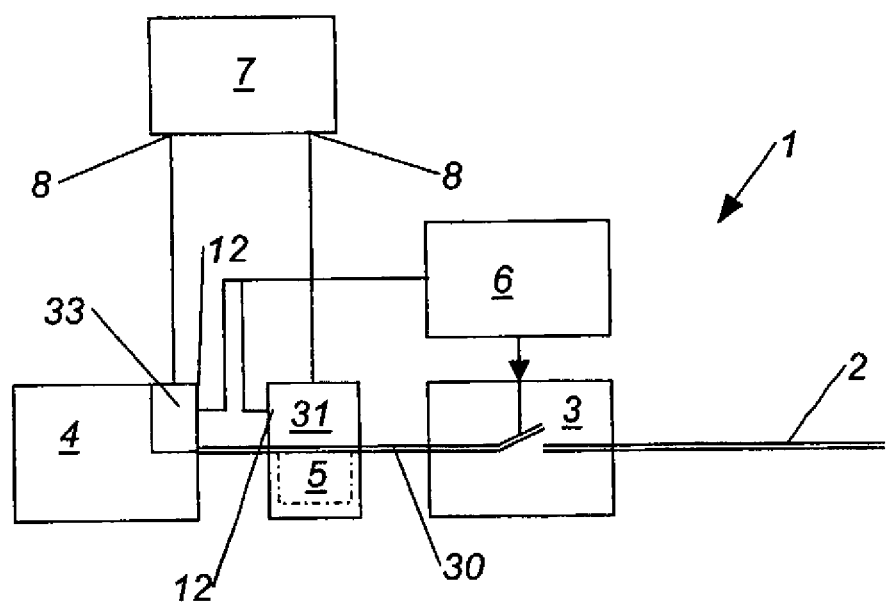
FIG. 2 shows a block diagram of a second embodiment of an installation arrangement in accordance with the invention.
Figure 3:
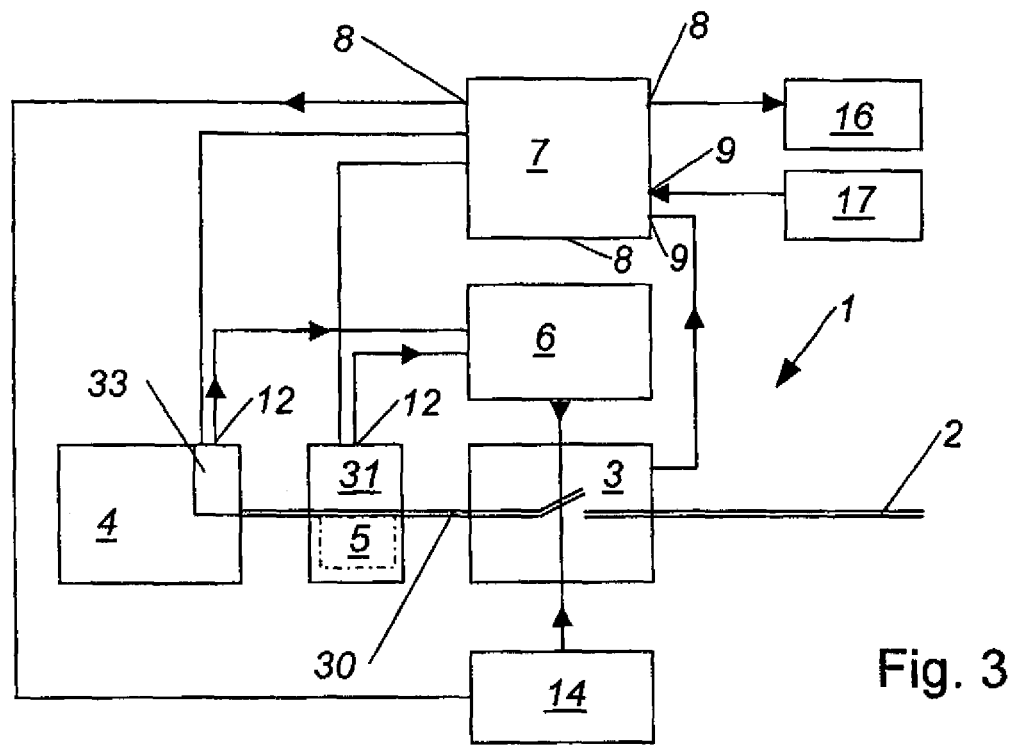
FIG. 3 shows a block diagram of a third embodiment of an installation arrangement in accordance with the invention.

It can be provided in an especially preferred way in especially simply arranged electrical installation arrangements 1 as are shown in FIGS. 1 to 3 for example that the first control and checking unit 7 controls the analytical and or evaluation schemes depending on time. This is especially advantageous in electrical installation units 1 which are arranged in areas which are subject to strict temporary access limitations such as time-controlled safe installations or public buildings such as schools, subways or museums. It is therefore provided in such embodiments that the first control and checking unit 7 comprises at least one clock, especially a time switch, for the automatic and time-controlled adjustment of the analytical and/or evaluation scheme.

FIG. 1 shows a basic arrangement of an electrical installation arrangement 1 in accordance with the invention, with the first arc detector 31 being arranged as a current sensor for example. The first consumer 4 can not only be a single first consumer 4 as shown in all embodiments represented in FIGS. 1 to 6, but can rather concern a predeterminable number of consumers 4. Furthermore, the at least one partial network 30 is also protected by the electrical installation arrangement 1 in accordance with the invention, to which further consumers 4 can be connected, especially by means of known plug-in connections. The embodiment according to FIG. 2 additionally comprises a second arc detector 33 which is directly arranged on the first consumer 4 and directly records first electrical parameters on the said first consumer 4. FIG. 3 shows an embodiment which in addition to the features of the embodiment according to FIG. 2 provides a status report of the first switching device 3 to the control and checking unit 7 by means of a respective connection, and wherein a first activation device 14 which can be controlled by the first control and checking unit 7 is operatively connected with the first switch 3, by means of which the first switching device 3 can be switched on again after deactivation. In addition, a display 16 and an input apparatus 17 is connected with the control and checking unit 7, so that direct control commands can be sent directly to the control and checking unit 7, wherein this connection can be arranged both in a wire-bound and wireless manner.

It is especially advantageous in areas which are frequented on an irregular basis by humans and/or animals worthy of protection that the electrical installation unit 1 controls the analytical and/or evaluation scheme depending on the presence of first living beings in a predeterminable first surrounding area around the first consumer 4 or the partial network 30. It is thereby possible to adjust the analytical and/or evaluation scheme in a purposeful way to humans present or other living beings present that are worthy of protection, or also to the local conditions. False tripping as a result of detected arcs can thereby be prevented when first living beings are present, so that false deactivations of the network 2 can be prevented during its use by the first living beings, whereas full protection against any kind of arcs is ensured during their absence, so that protection from fire is especially ensured and erroneous deactivations of electrical installations occur at a very low level in such periods because especially many of the machines causing such erroneous tripping will usually only occur in the presence of humans and/or farm animals.

It is therefore preferably provided for the control or adjustment of the first analytical and/or evaluation scheme by the control and checking unit 7 that it comprises at least one first means 10 for determining the presence of the first living being in the first surrounding area, wherein said first surrounding area can also relate to a complete partial network 30 as already explained above, which partial network can supply a room or a building or can pass through the same, or can also only relate to the direct and close vicinity around a consumer 4. The at least one first means 10 is further arranged for sending attendance data to the first control and checking unit 7, with the attendance data being a control parameter for the predeterminable and automatic adjustment of the analytical and/or evaluation scheme. The first means 10 therefore comprise at least one output or bus interface for the transmission of the attendance data to the control and checking unit 7.

Figure 4:
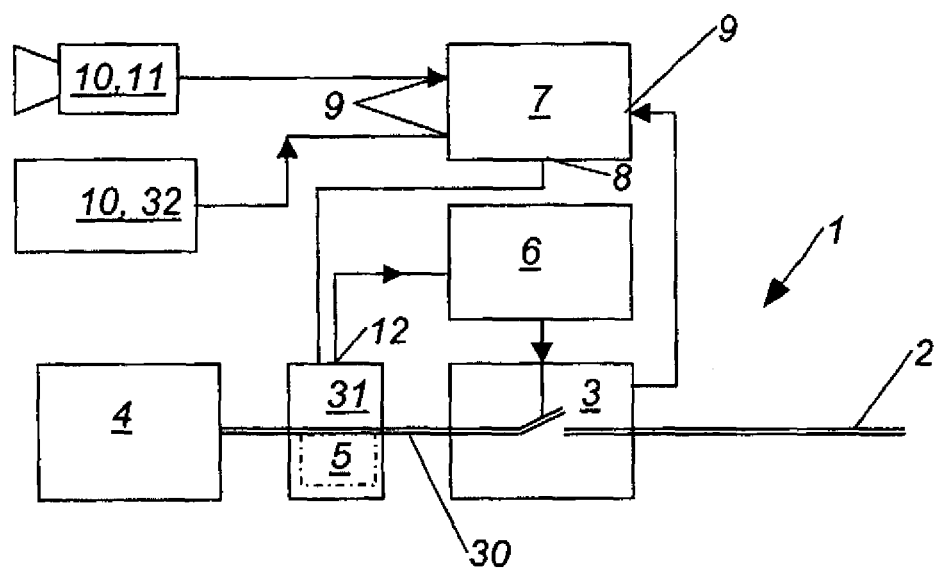
FIG. 4 shows a block diagram of a fourth embodiment of an installation arrangement in accordance with the invention.
Figure 5:
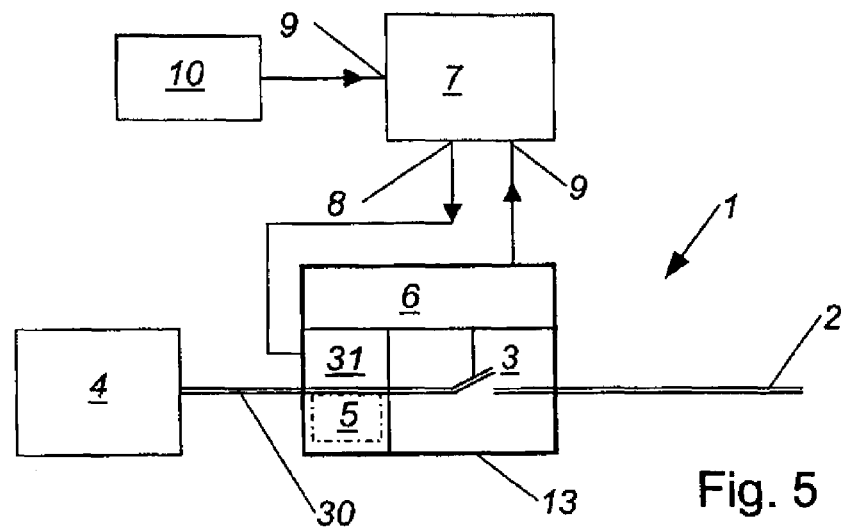
FIG. 5 shows a block diagram of a fifth embodiment of an isolation arrangement in accordance with the invention.
Figure 6:
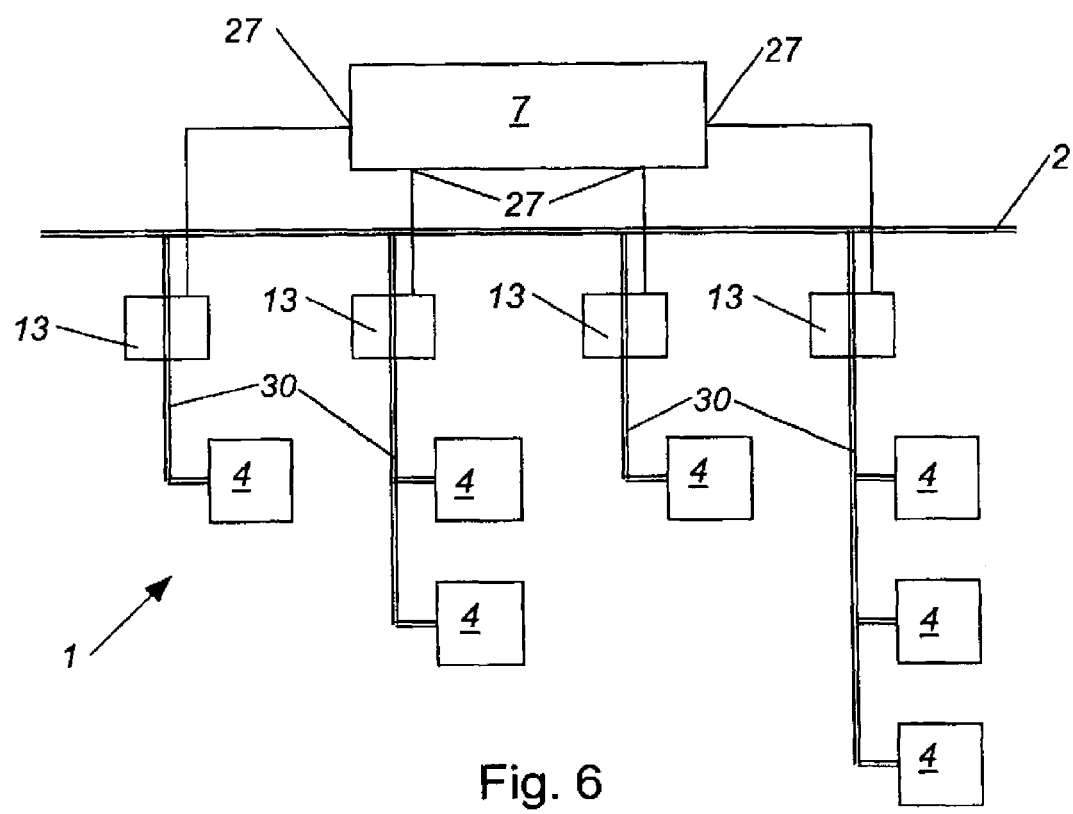
FIG. 6 shows a block diagram of a sixth embodiment of an installation arrangement in accordance with the invention.

The first means 10 for determining the presence of a first living being of a predeterminable type can be arranged as any kind of sensor which responds to the presence of a first living being of a predeterminable type in the first surrounding area or displays a reproducible change. It is preferably provided that the first means 10 for determining the presence of a first living being of a predeterminable type is arranged as a camera 11, an infrared sensor, a motion detector, the vibration sensor, a light barrier and/or a microphone. As a result, at least the presence of a living being of a predeterminable type can be detected in the first surrounding area and the analytical and/or evaluation schemes can be adjusted accordingly by the control and checking unit 7 with respect to the highest possible system availability or network availability in combination with the highest possible protection of the first living being. It can be provided as an alternative or in addition thereto that the first means 10 for determining the presence of a first living being comprise a radio receiver 32, especially an RFID receiver. It can be recognised thereby that a respective living being is present as a result of the access to an area by a living being that carries a respective transmitter such as an RFID chip or an RFID tag or has a respective implant, without said living bearing making any respective report about such access. FIGS. 4 and 5 show simple embodiments of such electrical installation arrangements 1, with the embodiment according to FIG. 4 comprising a first means 10 in the form of a camera 11, and with the embodiment according to FIG. 5, as already described above, providing the first tripping unit 6, the first switch 3 and the first arc detector 31 as an integral circuit breaker 13. FIG. 6 shows a schematic view of an electrical installation unit 1 with four circuit breakers 13, to which at least one first consumer 4 is respectively connected. As is illustrated, the circuit breaker 13 respectively protects the entire subsequent partial network 30.

It is provided in the operation of an electrical installation arrangement 1 in accordance with the invention, especially for the protection of the electrical installation arrangement 1 from arc-induced fires, preferably according to the description above, that at least one first arc detector 31 measures at least one first electrical parameter in the consumer network 2, and a first measuring signal determined in this manner is analysed and evaluated according to a first analytical and/or evaluation scheme, with at least one first switch 3 being switched off during the detection of an arc by at least one first tripping unit 6 and a consumer 4 and/or a partial network 30 will be disconnected in this manner from the consumer network 2, with a second analytical and/or evaluation scheme being predetermined in the presence of a first living being of a predeterminable type in a predeterminable first surrounding area around the first consumer 4 and/or the partial network 30, with the first analytical and/or evaluation scheme having a higher sensitivity than the second analytical and/or evaluation scheme, and with the first analytical and/or evaluation scheme being predetermined during the absence of the first living being in the first surrounding area In addition to the possibility of the temporarily predeterminable and automatic adjustment of the analytical and/or evaluation scheme, it is especially provided that the presence of a first living being of a predeterminable type in a predeterminable first surrounding area around the first consumer 4 or partial network 30 will be detected by the electrical installation arrangement 1.

Further embodiments in accordance with the invention merely have a part of the described features, wherein any combination of features can be provided, especially also such of different described embodiments.

The invention claimed is:

1. An electrical installation arrangement for the operation of an electrical consumer network, comprising:
   at least one first switch for the predeterminable disconnection of at least one first consumer and/or a partial network from the consumer network,
   at least one first arc detector, comprising at least one first sensor for measuring at least one first electrical parameter in the consumer network and for the output of a first measuring signal, with the arc detector further comprising an analysis unit for the analysis and/or evaluation of the first measuring signal as a result of at least one first analytical and/or evaluation scheme for recognizing an arc or at least an electrical effect of the arc on the electrical consumer network,
   at least one first tripping unit, which upon detection of an arc by the arc detector switches off the first switch and thereby disconnects the consumer and/or the partial network from the consumer network,
   wherein a second analytical and/or evaluation scheme is provided,
   wherein the first analytical and/or evaluation scheme has a higher sensitivity than the second analytical and/or evaluation scheme,
   wherein the second analytical and/or evaluation scheme is provided in the presence of a first living being of a predeterminable type in a predeterminable first surrounding area around the first consumer and/or the partial network, and
   wherein the first analytical and/or evaluation scheme is provided in the absence of the first living being in the first surrounding area.

2. An electrical installation arrangement according to claim 1, wherein the at least one first sensor is arranged as a current sensor and/or voltage sensor for recording a current and/or voltage signal in a manner especially substantially true to the signal.

3. An electrical installation arrangement according to claim 1, wherein the first sensor is arranged for recording a progression over time of the at least one first electrical parameter.

4. An electrical installation arrangement according to claim 1, wherein the analysis unit is arranged for analyzing the first measuring signal in the time area and/or in the image area and especially comprises a microprocessor, a microcontroller and/or digital signal processor.

5. An electrical installation arrangement according to claim 1, wherein the first analytical and/or evaluation scheme comprises at least one first arc recognition algorithm, that the second analytical and/or evaluation scheme comprises at least one second arc recognition algorithm, and that the first arc recognition algorithm has a higher sensitivity than the second arc recognition algorithm.

6. An electrical installation arrangement according to claim 1, wherein the first analytical and/or evaluation scheme comprises at least one first comparison parameter, that the second analytical and/or evaluation scheme comprises at least one second comparison parameter.

7. An electrical installation arrangement according to claim 1, wherein the first arc detector, the first tripping unit and the first switch are arranged integrally in the form of a first circuit breaker.

8. An electrical installation arrangement according to claim 1, wherein the electrical installation arrangement comprises at least one first control and checking unit for the predeterminable automatic adjustment of the analytical and/or evaluation scheme.

9. An electrical installation arrangement according to claim 1, wherein the first control and checking unit comprises at least one clock, especially a time switch, for the automatic and time-controlled adjustment of the analytical and/or evaluation scheme.

10. An electrical installation arrangement according to claim 8, further comprising at least one first means for determining the presence of the first living being in the first surrounding area, which means is arranged for transmitting presence data to the first control and check unit.

11. An electrical installation arrangement according to claim 10, wherein the first means for determining the presence of a first living being is arranged as a camera, infrared sensor, motion detector, vibration sensor, light barrier and/or microphone.

12. An electrical installation arrangement according to claim 10, wherein the first means for determining the presence of a first living being comprises at least one radio receiver, especially an RFID receiver.

13. A circuit breaker for an electrical installation arrangement according to claim 1, comprising at least one first arc detector and a first tripping unit which are operatively connected with switching contacts of the circuit breaker, wherein the circuit breaker comprises second means for the predeterminable automatic adjustment of an analytical and/or evaluation scheme.

14. A method for the operation of an electrical installation arrangement, especially for the protection of the electrical installation arrangement from arc-induced fires, wherein at least one first arc detector measures at least one first electrical parameter in the consumer network, and a first measuring signal determined in this manner is analyzed and evaluated at least according to a first analytical and/or evaluation scheme, with at least one first switch being switched off during the detection of an arc by at least one first tripping unit, and a consumer and/or a partial network is disconnected in this manner from the consumer network, wherein a second analytical and/or evaluation scheme is predetermined in the presence of a first living being of a predeterminable type in a predeterminable first surrounding area around the first consumer and/or the partial network, wherein the first analytical and/or evaluation scheme has a higher sensitivity than the second analytical and/or evaluation scheme, and wherein the first analytical and/or evaluation scheme is predetermined in the absence of the first living being in the first surrounding area.

15. A method according to claim 14, wherein the presence of the first living being of a predeterminable type in the predeterminable surrounding area is determined.

* * * * *